United States Patent [19]

Faulkner et al.

[11] 4,338,079
[45] Jul. 6, 1982

[54] METHOD AND APPARATUS FOR SUBJECTING MINERAL PARTICLES TO GAS FLOW

[75] Inventors: Bobby P. Faulkner, New Berlin; George T. Lee, West Allis; Peter L. Schumacher, Oak Creek; Michael H. Weinecke, Greenfield, all of Wis.

[73] Assignee: Allis-Chalmers Corporation, Milwaukee, Wis.

[21] Appl. No.: 219,998

[22] Filed: Dec. 23, 1980

Related U.S. Application Data

[63] Continuation-in-part of Ser. No. 105,982, Dec. 21, 1979, Pat. No. 4,270,899.

[51] Int. Cl.³ ............................ F27B 15/00; F26B 3/00
[52] U.S. Cl. ............................................. 432/14; 34/33; 34/236; 34/246; 432/58; 432/144
[58] Field of Search ................ 34/33, 57 D, 236, 240; 432/14, 15, 58, 138, 144

[56] References Cited

U.S. PATENT DOCUMENTS

| | | | |
|---|---|---|---|
| 626,202 | 5/1899 | Dula | 34/240 |
| 1,667,428 | 4/1928 | Mason | 34/236 |
| 1,960,616 | 5/1934 | Bartram | 34/33 |
| 3,329,263 | 7/1967 | Rush et al. | 209/662 |
| 3,518,944 | 7/1970 | Patin | 198/780 |
| 3,589,033 | 6/1971 | Bryand | 432/58 |
| 4,258,005 | 3/1981 | Ito et al. | 34/57 D |

*Primary Examiner*—John J. Camby
*Attorney, Agent, or Firm*—Lee H. Kaiser

[57] ABSTRACT

Roller grate method and apparatus for simultaneously transporting, agitating and exchanging heat with a bed of solid mineral particles has elongated cylindrical horizontal rollers with gas passage apertures therethrough, a hopper for feeding mineral particles onto the rollers and forming a bed having a depth several times greater than the average diameter of the particles; a drive source to rotate the rollers and frictionally engage the cylindrical surfaces with the particles in the lowermost layer of the bed and urge the bed along a path of travel transverse to the axes of the rollers; elongated filler members disposed in the nip between adjacent rollers to prevent the particles from jamming the rollers and to provide resistance to the flow of the bed along said path of travel; and a heat chamber spanning the rollers and a fan for forcing a heat transfer gas stream through the gas passage apertures in the rollers and through the bed as it is being transported, the rollers and the filler members being adapted to continually agitate the particles and to slowly transport the bed past the gas stream at a velocity which is only a minor fraction of the peripheral velocity of the rollers.

22 Claims, 8 Drawing Figures

METHOD AND APPARATUS FOR SUBJECTING MINERAL PARTICLES TO GAS FLOW

This application is a continuation-in-part of our application Ser. No. 105,982 filed Dec. 21, 1979 now U.S. Pat. No. 4,270,899.

This invention relates to method and apparatus for simultaneously transporting, agitating and subjecting solid mineral particles to gas flow, and more particularly to method and apparatus for conveying a deep bed of solid mineral particles at slow velocity while a heat transfer gas is forced through the bed and the particles are continually agitated to increase contact between the solid particles and the gas.

BACKGROUND OF THE INVENTION

Beds of solid mineral particles are often transported during heating or cooling on a horizontal traveling grate comprising parallel grate plates, or grate bars affixed at their ends to endless chains which engage sprocket drive wheels. For example, horizontal traveling grates are used to convey beds of solid mineral particles in limestone, cement and iron ore indurating systems while heating or cooling gas streams are forced through the bed carried on the grate plates. A significant amount of heat energy is wasted as the grate plates and grate chain return. The bed of mineral particles is esentially static as it is transported by the traveling grate, and a relatively high drop exists in the pressure across the bed required to blow the heat tranfer gas stream through the bed. Further, relatively high horsepower motors are required to drive the traveling grate chain and the fans which force the gas streams through the bed.

Screens for conveying and sizing material particles such as green taconite pellets are also known which comprise a series of driven, spaced-apart, parallel, screen rods, or rollers, such as disclosed in U.S. Pat. Nos. 2,988,781; 3,438,491 and 3,848,744. The particles are transported in a single layer at a speed approaching the circumferential velocity of the rollers, the rollers may be of different diameter and driven at different speeds to convey the pellets, the spacing between rollers is varied to classify the pellets according to size, and the rollers may be covered with abrasive resistant rubber, as taught in U.S. Pat. No. 3,438,491, or may have a hard chromium outer shell, as taught in U.S. Pat. No. 3,848,744, to extend the service life of the rollers. Such conveying and sizing roller screens are not adapted to exchange heat with the pellets and are incapable of transporting a deep bed of pellets at slow velocity while forcing a heat transfer gas stream through the bed.

OBJECTS OF THE INVENTION

Accordingly, it is an object of the invention to provide improved solid mineral particle bed transporting and heat exchange apparatus which eliminates the heat energy lost in prior art traveling grate apparatus as the result of the grate plates and grate chain returning through the atmosphere.

It is a further object of the invention to provide improved method and apparatus for simultaneously transporting and forcing a heat transfer gas stream through a bed of solid mineral particles which increases the heat transfer between the particles and the gas stream in comparison to prior art apparatus.

It is a still further object of the invention to provide improved method and apparatus for conveying and subjecting solid mineral particles to gas flow which continually agitates the particles while they are being conveyed so that all surfaces of the particles are exposed to the gas and the heat transfer between particles and gas is consequently improved in comparison to traveling grate apparatus.

Still another object of the invention is to provide improved method and apparatus for transporting and subjecting solid mineral particles to gas flow which transports a deep bed of the particles at slow speed and continually agitates the particles to improve the solid-to-gas contact and the heat transfer coefficient in comparison to traveling grate apparatus.

Another object is to provide improved method and apparatus for transporting a deep bed of solid mineral particles at slow velocity while forcing a heat transfer gas stream through the bed and continually agitating the particles wherein the pressure drop and the temperature gradient across the bed are both significantly lower than in prior art apparatus.

A still further object is to provide improved solid mineral particle transporting and heat exchange apparatus which: (1) has lower capital cost and lower maintenance costs than traveling grate apparatus; (2) eliminates the return strand of traveling grate apparatus; and (3) used particle transporting rollers in certain zones of the apparatus which are of less expensive material than the alloy steel grate plates of traveling grate apparatus.

Still another object of the invention is to provide improved method and apparatus for transporting a deep bed of solid mineral particles at slow velocity and continuously agitating the particles while transferring heat to or from the bed which requires less space for the conveyor apparatus, permits use of lower horsepower drive and fan motors, and requires lower cost to operate such motors than prior art traveling grate apparatus.

SUMMARY OF THE INVENTION

In accordance with the method of the invention, solid mineral particles are subjected to gas flow by the steps of delivering the particles onto horizontal apertured cylindrical rollers; forming a bed of the particles on the rollers having a depth several times greater than the average diameter of the particles; continually transferring the particles in the lowermost layer of the bed onto filler bars disposed in the nip between adjacent rollers by rotating the rollers to frictionally engage their cylindrical surfaces with said particles and thereby agitate the particles and urge the bed in a path of travel transverse to the axes of the rollers; passing a heat transfer gas stream in a generally vertical direction transverse to said path of travel through the apertures in the rollers and through the bed as it is being transported; and controlling the speed of the rollers so that the bed is transported past the gas stream at a relatively slow velocity which is only a minor fraction of the circumferential velocity of the rollers. Some embodiments of the method include the additional step of controlling bed transport speed and/or bed depth by rotating certain downstream rollers at slower speeds than the upstream rollers. The method of the invention includes introducing resistance to the flow of the mineral particle bed by inserting filler bars in the nip between adjacent rollers to thereby transport the bed past the heat transfer gas stream at a relatively slow velocity which is only a minor fraction of the circumferential velocity of the rollers, and certain embodiments include the step of controlling bed transport speed by selectively inserting filler bars of different width between the rollers to thereby vary the magnitude of resistance to bed flow.

Roller grate apparatus in accordance with the invention for slowly conveying solid mineral particles while continually agitating them and subjecting them to gas flow comprises a plurality of parallel horizontal rollers having gas passage apertures therethrough; elongated filler bars disposed in the nip between adjacent rollers with their upper surfaces disposed below the uppermost surfaces of the adjacent rollers; means for delivering the particles onto the rollers and filler bars and for forming a bed of said particles thereon having a depth several times greater than the average diameter of the particles; means to rotate the rollers to thereby frictionally engage their cylindrical surfaces with the bed and continually transfer the particles in the lowermost layer of the bed onto the filler bars and thereby agitate the particles and urge the bed along a path of travel transverse to the longitudinal axes of the rollers, said roller rotating step being at a circumferential velocity substantially higher than the bed transport speed along said path of travel; and means to pass a gas stream in a generally vertical direction through the gas passage apertures and the bed while it is being transported. The filler bars comprise means to prevent the particles from jamming the rollers and to provide resistance to flow of the bed along said path of travel, and the configuration of the filler bars and their disposition in the nip between adjacent rollers influence the magnitude of the resistance to bed flow and thus modify bed transport speed and the depth of bed. In certain embodiments the downstream filler bars are wider in the direction between adjacent rollers to decrease the bed transport speed and/or increase bed depth. In other embodiments the gas passage apertures are generally circumferential slots in the cylindrical surfaces of the rollers which have minimum tendency to abrade the particles against the filler bars. The solid mineral particles are continuously agitated by the rollers as they are conveyed so all surfaces of the particles are exposed to the heat transfer gas stream, thereby increasing the solid-to-gas contact and improving heat transfer between the gas stream and the particles in comparison to prior art traveling grate apparatus and also reducing the pressure drop and the thermal gradient across the bed.

IN THE DRAWINGS

FIG. 9 is a cut-away view showing a portion of the drive means at the backside of the hood shown in FIG. 1 for rotating the rollers.

DESCRIPTION OF PREFERRED EMBODIMENTS

Figure 1:
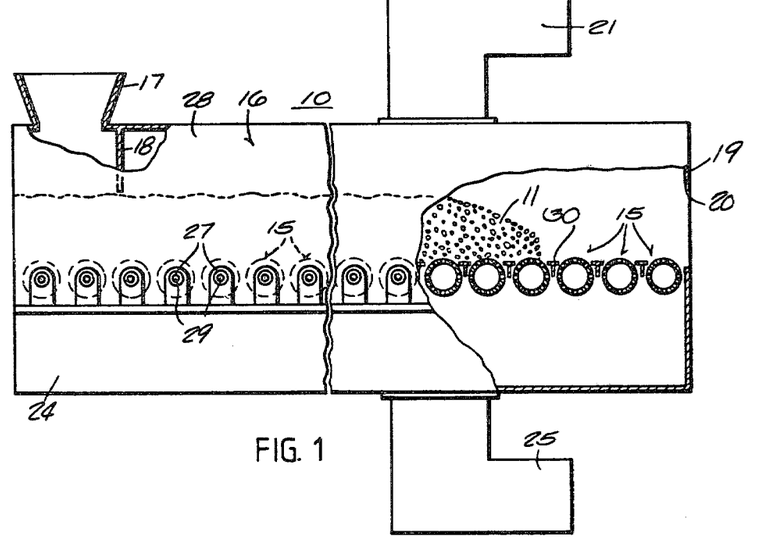
FIG. 1 is a front view, partially in section, of the drying zone of an indurating system preheater embodying the invention.

Referring to the drawings, FIG. 1 shows the drying zone 10 of a roller grate indurating system preheater embodying the invention adapted to simultaneously slowly convey, agitate and transfer heat to a deep bed 11 of discrete solid particles of minerals such as limestone, cement, oil shale or green iron-ore pellets. Preferably the particles are of a size in the range from $\frac{3}{8}$ inch to $1\frac{1}{2}$ inch diameter with the size of the largest particles being approximately 3 inch diameter, such limitation being imposed by the time required to conduct heat to the center of the particle. Preheater drying zone 10 includes a plurality of parallel, horizontal, elongated cylindrical rollers 15 mounted for rotation about their longitudinal axes and having gas passage apertures 32 therethrough. Rollers 15 form a roller grate for solid mineral particle bed 11 and are enclosed within an airtight chamber, or hood 16 which spans the plurality of rollers 15 and typically is approximately 50 feet or more in length. Chamber 16 may have means for delivering the particles onto rollers 15 comprising an inlet hopper 17 for receiving particles such as iron ore pellets from a balling drum and feeding the pellets onto rollers 15, means for forming a non-fluidized bed of the particles on rollers 15 including a transverse internal wall portion 18 adjacent feed hopper 17 which establishes the bed depth to be several or more times greater than the average diameter of the particles, and a transverse partition 19 providing an outlet 20 through which the heated pellets are discharged to a subsequent heat transfer zone of the indurating system such as a preburn zone. Feed hopper 17 permits the method step of delivering the particles onto the rollers, and transverse wall 18 contributes to the step of forming a bed on the rollers having a depth several times greater than the average diameter of the particles. Preferably rollers 15 are of sufficiently large diameter so that the particles do not engage the uppermost surfaces of adjacent rollers and are not transported at the speed of rollers 15. The grate plates of a traveling grate must be of a material such as high alloy steel that can withstand the hottest indurating system temperature that they move through which, for example, may be in a preburn zone. The material required for rollers 15 is dependent upon the maximum temperature in the heat transfer zone in which they are positioned, i.e., in the drying zone. Inasmuch as rollers 15 in drying zone 10 are not exposed to the hottest temperature for the indurating system, in the same manner as the grate plates of a conventional traveling grate, rollers 15 in drying zone 10 need not be of a high alloy steel, and only approximately $\frac{1}{3}$ of the rollers of an iron ore pellet preheater need be constructed of high alloy steel.

A heating gas inlet duct 21 may register with hood 16 and receive hot kiln-off gases from an indurating system kiln (not shown). A motor-driven blowing fan (not shown) communicating with inlet duct 21 may, if desired, in known manner force the heated gases to pass through gas passage apertures 32 and rollers 15 and through mineral particle bed 11 as it is transported. A windbox, or suction box 24 positioned beneath rollers 15 may span the plurality of rollers 15 and collect downdraft heating gases which have passed through the bed 11 on rollers 15. A gas exhaust duct 25 may register with windbox 24, and a motor-driven suction fan (not shown) may, if desired, be disposed in exhaust duct 25 to suck the heating gases out from windbox 24. It will be apparent that the method step of forcing a gas stream through the gas passage aperture 32 and through the bed is accomplished by hood 16, inlet duct 21, exhaust duct 25, the motor-driven blowing fan within duct 21 and the suction fan within exhaust duct 25.

Cylindrical rollers 15 may be attached to elongated shafts 27 which pass through the sidewalls 28 of hood 16 and are journalled at their ends for rotation about their longitudinal axes in nonfriction bearings 29 outside of the hot zone within hood 16. Suitable seals (not shown) may be provided between shafts 27 and the sidewalls 28 of hood 16, and it will be appreciated that such seals can be simpler than the sealing means required for a traveling grate wherein the grate chains pass through the heat transfer chamber. Each shaft 27 has a sprocket wheel 31 attached to one end for engagement with an endless driving chain 40 for rotating rollers 15. Drive means for a plurality of rollers are well known such as disclosed in U.S. Pat. No. 3,438,491. The drive means for rotating the plurality of rollers 15 at the same speed may include two drive chains, one on each side of hood 16. In alternative embodiments rollers 15 are driven by chains between adjacent rollers, and in still other embodiments certain of rollers 15 are driven at different speeds to control bed transport speed or the depth of bed 11.

Elongated filler bars, or filler members 30, preferably of T-shape cross-section are disposed in the nip between adjacent rollers 15 above their longitudinal axes and are affixed at their ends to sidewalls 28 of hood 16. Filler bars 30 comprise means to prevent the solid mineral particles from entering the gap between adjacent rollers 15, thereby preventing the particles from being crushed between adjacent rollers 15 and also preventing the particles from jamming the rollers 15. Further, filler bar means 30 provide resistance to the flow of bed 11 along a path of travel transverse to the axes of the rollers 15. The horizontal upper surfaces 33 of the T-shape filler bars 30 are disposed below the uppermost surfaces of the adjacent rollers 15 so that the particles are agitated vertically as they are transferred between rollers and filler bars. The filler bars 30 have maximum resistance to bending when the stem of the T-shape cross-section is disposed vertically and the cross bar thereof is disposed horizontally. In an alternative embodiment represented in FIG. 5 the filler bars 30' are of triangular cross-section.

Filler bars 30 introduce resistance to the flow of bed 11 and permit the bed to be transported past the heat transfer gas stream at a velocity which is only a minor fraction of the peripheral velocity of rollers 15. It will be appreciated that the bed flowrate and bed depth are dependent upon both the width of filler bars 30 and their position relative to the roller longitudinal axes and, further, that by minimizing the width of filler bars 30 the speed of rollers 15 can be decreased to obtain the same bed flowrate or, alternatively, the depth of bed 11 can be increased or its flowrate decreased by increasing the width of filler bars 30.

Rollers 15 together with filler bars 30 form a generally flat surface for mineral particle bed 11 having constantly moving cylindrical portions which frictionally engage the particles in the lowermost layer of the bed and tend to transfer them onto and across filler bars 30 and thereby continually agitate the particles in bed 11 and urge the bed 11 along a path of travel transverse to the longitudinal axes of rollers 15. In typical preheaters the length of hollow rollers 15 may be from 8 to 18 feet, and the roller diameter may vary from 4 to 12 inches depending upon the particular material being conveyed and heated. The rollers 15 deflect slightly under their own weight and the weight of the bed 11, and the minimum diameter of hollow rollers which will not deflect more than an arbitrary amount, e.g., $\frac{1}{8}$ inch, at its center is approximately 6 inches for hollow rollers of 12 foot span, 8 inches for hollow rollers of 15 foot span, and 10 inches for rollers of 18 foot length. The filler bars 30 allow large diameter rollers 15 to be used since the nip angle between adjacent rollers is not of concern.

Figure 2:
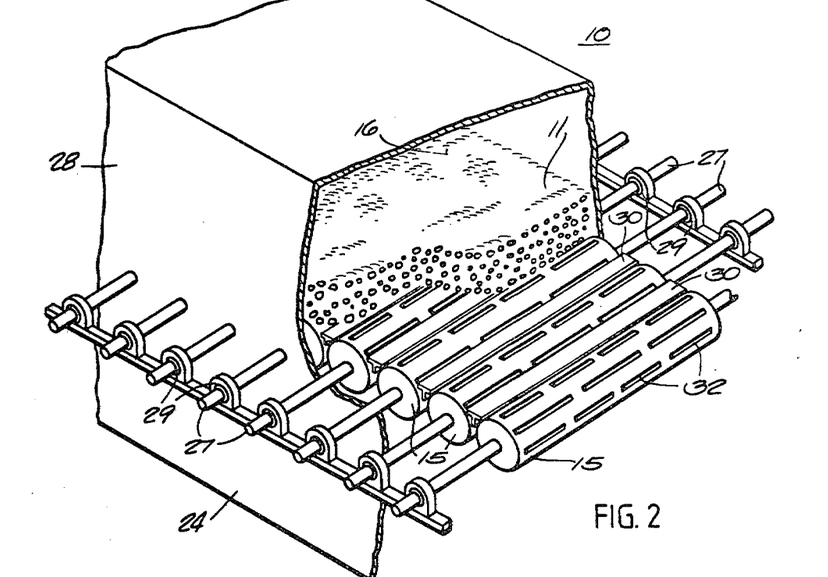
FIG. 2 is a partial perspective view of the FIG. 1 embodiment.
Figure 3:
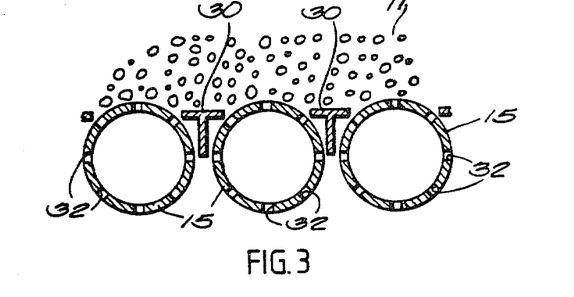
FIG. 3 is a cross-section view taken through a plurality of rollers of the FIG. 1 embodiment.

Rollers 15 of drying zone 10 may be hollow and have a plurality of gas passage apertures 32 therethrough which may be of any desired configuration and are shown in FIGS. 1-3 as radially extending slots elongated in a direction parallel to the roller longitudinal axes to permit the heating gas stream to pass vertically through the mineral particle bed 11. In one embodiment using hollow stainless steel rollers 15 of four inch diameter, the total area of the slots 32 in each roller is approximately fifteen percent of the roller surface area, the gap between adjacent rollers 15 is approximately $\frac{1}{8}$ inch, the filler bars 30 are 1-$\frac{1}{4}$ inch wide, and the projected area of the slots 32 and gaps between adjacent rollers 15 is approximately 17 percent of the total surface area formed by rollers 15 and filler bars 30. In such embodiment the width of the filler bars 30 is approximately 31 percent of the diameter of the rollers 15, and preferably the width of filler bars 30 adjacent the upstream end of chamber 16 is the range from 1/5 to $\frac{1}{2}$ of the roller diameter. Iron ore pellet beds 11 of up to ten inch depth are conveyed on this embodiment at speeds up to 200 inches per minute with roller speeds in the range of 100 to 150 rpm, and limestone beds of eight inch depth are conveyed at speeds up to 90 inches per minute at roller speeds of 145 rpm with very little degradation of the limestone.

Figure 4:
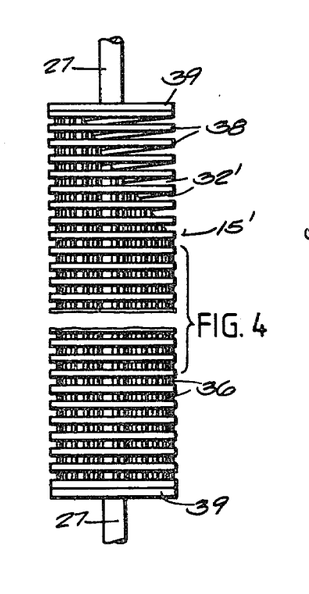
FIG. 4 is a plan view of a roller having circumferential gas passage apertures.
Figure 5:
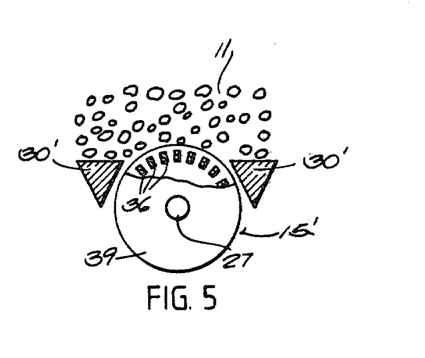
FIG. 5 is a cross-section view through the FIG. 4 roller installed in the FIG. 1 apparatus with filler bars of triangular cross-section.

FIGS. 4 and 5 illustrate an alternative embodiment particularly suited for conveying green iron ore pellets during heating or cooling in which rollers 15' have gas passage apertures in the form of circumferential, or spiral, slots 32' in the cylindrical roller surfaces. Breakage of pellets can occur when they are caught between the axially extending slots 32 and the filler bars 30 of the FIGS. 1-3 embodiment. In contrast, the circumferential slots 32' of the rollers 15' of the FIGS. 4 and 5 embodiment have minimal slot length parallel to filler bars 30 tending to catch and break a pellet and, consequently, pellet breakage is significantly reduced.

As shown in FIGS. 4 and 5 each roller 15' preferably comprises a pair of spaced circular steel end plates 39 affixed to a shaft 27 and a plurality of elongated steel bars 36 welded in spaced relation to end plates 39 parallel to the axis of shaft 27 so bars 36 form a cylinder. A stainless steel bar 38 (for example, of 2 millimeter width) is spirally wound on top of and welded to the bars 36 with space between adjacent convolutions to provide the circumferential gas passage slots 32' between adjacent spiral turns of bar 38.

As described hereinbefore, the configuration of filler bars 30 and their position in the nip between adjacent rollers 15 affect the depth of bed 11 and also the bed transport rate, and filler bars 30 preferably have a horizontal upper surface 33 positioned below the uppermost surface of the adjacent rollers 15 so that the particles in the lowermost layer of bed 11 are transferred (due to frictional engagement with the cylindrical surfaces of rollers 15) from rollers 15 onto upper surfaces 33 of filler bars 30 and said particles are thus continually agitated and bed 11 is urged by rollers 15 along the path of travel transverse to the roller axes. In order to achieve relatively slow transport of bed 11 past the heat transfer gas stream, upper surfaces 33 of T-shape filler bars 30 preferably have a width in a direction between rollers in the range between 1/5 to ½ the diameters of rollers 15.

Figures 6, 7:
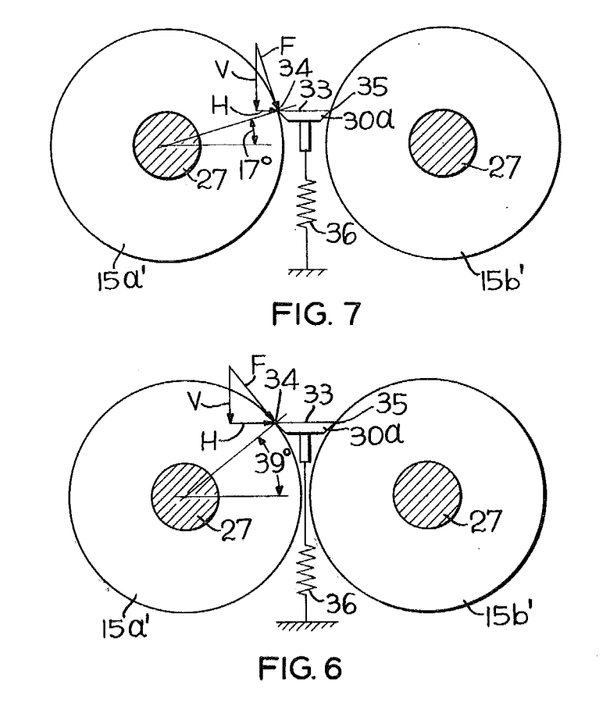
FIGS. 6 and 7 are schematic views illustrating the positions of the filler bars in the nip between adjacent rollers in different embodiments of the invention.

Rotation of the rollers at very low speeds to accomplish slow transport of the bed past the heat transfer gas stream has been found unsatisfactory because the particles jam between the filler bars and the rollers at such low speeds. FIG. 6 illustrates a T-filler bar 30a disposed in the nip between adjacent rollers 15a'-15b' of an embodiment especially adapted for conveying a relatively deep bed of limestone particles and having beveled upstream and downstream longitudinal edges 34 and 35 respectively and wherein upper surface 33 has a width of approximately 1.1875 inches in the direction between adjacent rollers. In the FIG. 6 embodiment, rollers 15a' and 15b' are of 4.75 inch outer diameter and are spaced apart approximately ⅛ inch. Upstream beveled edge 34 of filler bar 30a abuts upstream roller 15a' at a point where the radius of roller 15a' makes an angle of approximately 39° with the horizontal and the tangential frictional force F of roller 15a' on a solid mineral particle in the lowermost layer of bed 11 has a vertically downstream component V tending to move the particle downward onto surface 33 which is approximately 1.2 times greater than the horizontal component H of tangential force F. The greater vertical component V than horizontal component H tends to push T-filler bar 30a downward into the gap between adjacent rollers 15a'-15b' rather than away from upstream roller 15a' since the horizontal component H tends to open a gap between filler bar 30a and upstream roller 15a'. Spring means 36 illustrated schematically resiliently urge filler bar 30a in a downward direction toward rollers 15a'-15b' and thus maintain a minimum gap between the rollers and the filler bars. As the rollers 15a'-15b' rotate, any high spots thereon tend to push the filler bar 30a upward and thus stretch spring means 36 so that the spring force tending to keep the filler bars against the rollers is increased.

Even greater protection against jamming of particles between filler bars and rollers is achieved in the embodiment illustrated in FIG. 7 wherein filler bar 30a is disposed lower in the nip between adjacent rollers 15a'-15b' than in the FIG. 6 embodiment so that the vertically downward component V of tangential frictional force F on a particle is approximately 3.3 times greater than the horizontal component H. Rollers 15a' and 15b' are spaced with a 1.0 inch gap in the FIG. 7 embodiment, and the upstream beveled edge 34 of filler bar 30a abuts upstream roller 15a' at a point where a radius thereof makes an angle of approximately 17° with the horizontal. The FIG. 7 embodiment was found to operate without jamming of rollers 15a'-15b' even at relatively low roller speeds because the vertically downward component V of the tangential frictional force F acting on the particles tending to push filler bar 30a against roller 15a' is relatively high and the horizontal component H tending to push it away from roller 15a' is relatively low. Both embodiments eliminate jamming of the rollers and result in the desired slow velocity of bed 11, which is only a minor fraction of the circumferential velocity of the rollers, past the gas stream which enters chamber 16 through inlet duct 21 and may be forced through bed 11 by a fan in inlet duct 21 and is exhausted through duct 25.

Because of the configuration of the rollers and the filler bars which effect agitation of the particles, the smaller particles in bed 11 tend to rapidly settle to the bottom of bed 11 after passing over only a few filler bars and rollers so that segregation of particle sizes within bed 11 is rapidly achieved after the particles have been transported only a few feet beyond feed hopper 17.

In some embodiments of the invention, particles at different depths within bed 11 are transported at different speeds along the path of travel. If particles of different color are intentionally disposed in the uppermost and lowermost layers of bed 11, it can be observed in these embodiments that the particles in the uppermost layer are conveyed at approximately ½ the velocity of the particles in the lowermost layer.

Resistance to bed flow may be introduced to control bed transport speed or bed depth. In certain embodiments of the invention rollers 15 adjacent outlet 20 from hood 16 are rotated at slower speed than rollers 15 upstream therefrom adjacent feed hopper 17 for the purpose of increasing the depth of bed 11 and/or also for the purpose of slowing down bed transport speed. In other embodiments certain rollers 15 adjacent outlet 20 from hood 16 are stopped for the purpose of increasing the bed depth and/or decreasing bed transport speed. Alternatively, in still other embodiments filler bars 30 are selectively inserted between rollers 15 adjacent outlet 20 which are wider in a direction between rollers than filler bars 30 upstream therefrom for the purpose of increasing resistance to bed flow and thereby increase the depth of bed 11 and/or decrease the bed transport speed. In the embodiments of FIGS. 6 and 7, filler bar 30a are of the type utilized adjacent the feed end of the roller grate and are of 1.1875 inch width between 4.75 inch diameter rollers so the ratio of filler bar width to roller diameter is approximately 1-to-4, and in such embodiments filler bars (not shown) may be selectively inserted between rollers 15a'-15b' adjacent outlet 20 from hood 16 having a ratio of filler bar width to roller diameter in the range of from 1-to-3 to 1-to-2 for the purpose of controlling bed depth or bed transport speed.

Figure 8:
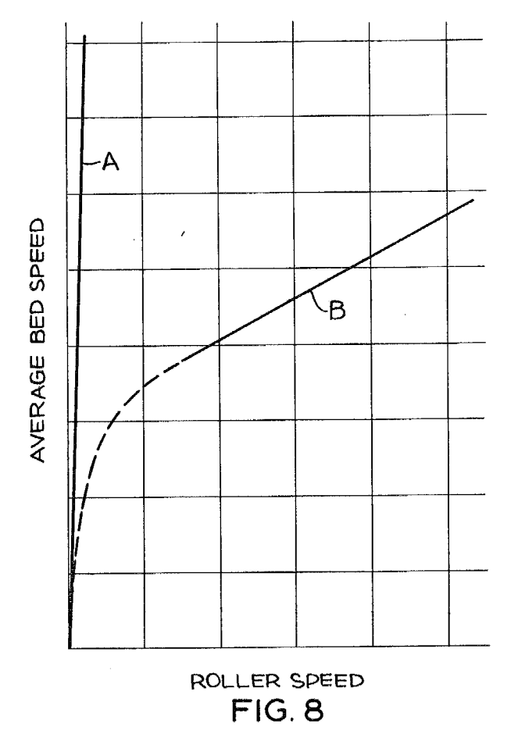
FIG. 8 is a graph illustrating variation of average bed speed with change in roller speed in an embodiment of the invention similar to FIG. 7.

FIG. 8 is a graph plotting roller speed (as abscissae) versus average velocity of a deep limestone bed (as ordinates) in an embodiment similar to FIG. 7. Curve A shows the material flowrate when the bed is transported at the peripheral velocity of the rollers and illustrates that the flowrate is much too high to effectively heat the limestone particles when the heat transfer gas stream is forced through the bed. Curve B shows the bed flowrate in accordance with the invention when the velocity of bed transport is only a minor fraction of the peripheral velocity of the rollers and the bed is transported slowly to achieve a high coefficient of heat transfer.

While our invention has been disclosed as embodied in a drying zone 10 of an indurating system preheater, it will be readily apparent that our invention may also be embodied in other material bed conveying and heat exchange apparatus such as preburn and cooling zone indurating apparatus.

Beds of material such as limestone, green iron ore pellets, indurated iron ore pellets, cement and oil shale having a depth greater than several times the average diameter of the mineral particles can be conveyed on the disclosed roller grate material bed conveying and heat exchange apparatus at speeds equal to that typically used on traveling grates and which are only a minor fraction of the circumferential velocity of the rollers. The rotating cylindrical rollers 15 tend to transfer the particles in the lowermost layer of the bed 11 downward onto and across the filler bars 30 and continually agitate the particles and thus produce a dynamic bed in which all surfaces of the particles are exposed to the gas stream, in comparison to known traveling grate systems wherein the bed material remains static on the roller grate plate as the plate is moved. Such dynamic bed increases the solid-to-gas contact, improves heat transfer between material bed particles and the gas stream, and also reduces both the pressure drop and temperature gradient across the bed, in comparison to the static bed transported on prior art traveling grate apparatus.

The following Table 1 compares the pressure drop measured across a bed of indurated pellets being conveyed by apparatus embodying the invention having four inch rollers (termed "roller grate") in comparison to the pressure drop across a similar bed being conveyed by a traveling grate (termed "traveling grate"):

TABLE 1

| | | PRESSURE DROP ACROSS BED OF INDURATED PELLETS | | | | |
|---|---|---|---|---|---|---|
| AVG. BED DEPTH (IN.) | ROLLER SPEED (RPM) | AIR FLOWRATE (SCFM/FT$^2$) | AIR TEMP. (°F.) | TRAVELING GRATE AVG. PRESSURE DROP (IN. H$_2$O) | ROLLER GRATE AVG. PRESSURE DROP (IN. H$_2$O) | % DECREASE ROLLER GRATE OVER TRAVELING GRATE |
| 5 | 65 | 159 | 75 | 0.75 | 0.61 | 19 |
| 6 | 65 | 205 | 75 | 1.24 | 1.19 | 4 |

The following Table 2 compares the heat transfer coefficient measured between the gas stream and beds of material being conveyed by apparatus embodying the invention having four inch rollers (termed "Dynamic Bed") in comparison to the heat transfer coefficient calculated for similar material beds being conveyed by a traveling grate (termed "Static Bed"):

TABLE 2

| | HEAT TRANSFER COEFFICIENT | | | |
|---|---|---|---|---|
| | MEASURED (DYNAMIC BED) (BTU/HR FT$^2$-°F.) | CALCULATED (STATIC BED) (BTU/HR FT$^2$-°F.) | AIR FLOWRATE (SCFM/FT$^2$) | BED DEPTH (IN.) |
| Fired Iron Ore Pellets | 12.7 | 9 | 218 | 3 |
| Limestone | 13.6 | 9.8 | 197 | 6 |
| Green Iron Ore Pellets | 31.9 | 15.8 | 200 | 2 |

It will be appreciated that the disclosed roller grate solid mineral particle bed conveying and heat exchange apparatus eliminates the large heat loss which occurs when the grate plates and chain of a typical traveling grate conveyor return through the atmosphere, which heat loss has been measured to be 15 percent of the total energy input in an iron ore pelletizing plant. It will also be appreciated that the rollers of the disclosed solid mineral particle bed conveying and indurating apparatus are not all exposed to the hottest temperature in the same manner that all of the grate plates of a typical traveling grate conveyor are exposed and must be made of material that can withstand the hottest temperature the grate plates will reach, and only approximately ⅓ of the rollers 15 of an iron ore pellet conveying and indurating preheater embodying our invention need be of high alloy steel. Still further, inasmuch as the rollers 15 remain in one position, they are exposed to a constant temperature in comparison to the temperature cycle that the grate plates and chain of a typical traveling grate undergo. Consequently the thermal stress on the rollers 15 is reduced and the life thereof is increased significantly in comparison to the same factors for the plates of a typical traveling grate conveyor.

The embodiments of the invention in which an exclusive property or privilege is claimed are defined as follows:

1. Roller grate apparatus for simultaneously agitating solid mineral particles and subjecting them to gas flow comprising, in combination, a plurality of parallel horizontal cylindrical rollers having gas passage apertures therethrough, means for continuously feeding said particles onto said rollers and for forming a non-fluidized bed of said particles thereon of a depth several times greater than the average diameter of said particles, means including elongated filler members disposed in the nip between adjacent rollers with their upper surfaces disposed below the uppermost surfaces of said rollers for introducing resistance to the flow of said bed along a path of travel transverse to the axes of said rollers, means to transport said bed along said path of travel including means to rotate said rollers and continuously transfer particles in the lowermost layer of said bed onto and across said filler members and urge said bed along said path of travel, said rollers together with said filler members being adapted to continually agitate said particles and transport said bed along said path of travel at a velocity which is only a minor fraction of the circumferential velocity of said rollers, and means to pass a gas stream in a direction transverse to said path of travel through said gas passage apertures and said bed while it is being so transported.

2. Roller grate apparatus for subjecting solid mineral particles to gas flow comprising, in combination, a plurality of parallel horizontal cylindrical rollers having gas passage apertures therethrough, means for continuously delivering said particles onto said rollers and forming a bed of said particles thereon having a depth several times greater than the average diameter of said particles, means including elongated filler member means disposed in the nip between adjacent rollers for preventing said particles from jamming said rollers and for providing resistance to the flow of said bed in a path of travel transverse to the axes of said rollers, means to transport said bed along said path of travel including means to rotate said rollers to frictionally engage their cylindrical surfaces with said particles in the lowermost layer of said bed and exert tangential forces on said particles tending to transfer said particles onto and across said filler member means and urge said bed in said path of travel, said rollers together with said filler member means being adapted to continuously agitate said particles and transport said bed along said path of travel at a velocity which is only a minor fraction of the circumferential velocity of said rollers, and means to pass a gas stream in a generally vertical direction transverse to said path of travel through said gas passage apertures and said bed while it is being so transported.

3. Roller grate apparatus for slowly conveying solid mineral particles and simultaneously agitating and subjecting them to gas flow comprising, in combination, a plurality of parallel horizontal cylindrical rollers having gas passage apertures therethrough and being of a diameter greater than the average diameter of said particles, means including elongated filler members disposed in the nip between adjacent rollers for controlling the velocity of said bed along a path of travel transverse to the axes of said rollers, said filler members having upper surfaces positioned below the uppermost surfaces of said rollers so that said particles are agitated as they pass across said rollers and filler members, means for continuously feeding said particles onto said rollers and filler members and for forming a non-fluidized bed of said particles thereon having a depth several times greater than the average diameter of said particles, means for transporting said bed along said path of travel including means to rotate said rollers to thereby frictionally engage their cylindrical surfaces with the particles in the lowermost layer of said bed and exert tangential forces thereon having horizontal and vertical downward components vectors tending to transfer said particles onto and across said filler members and urge said bed along said path of travel, said filler members comprising means to prevent said particles from jamming said rollers and to introduce resistance to movement of said bed along said path of travel and said rollers together with said filler members being adapted to continuously agitate said particles and transport said bed along said path of travel at a velocity which is only a minor fraction of the circumferential velocity of said rollers, and means including a heat transfer chamber enclosing a plurality of said rollers for passing a gas stream in a generally vertical direction through said gas passage apertures and said bed while it is being so transported.

4. Roller grate apparatus in accordance with claim 1, 2 or 3 wherein said filler members have horizontal upper surfaces whose width in the direction between said adjacent rollers is in the range between ½ and 1/5 the diameter of said rollers.

5. Roller grate apparatus in accordance with claim 4 wherein the upstream edge of said horizontal upper surfaces of said filler members abuts the upstream adjacent roller at a point where a force vector tangential of said upstream roller has a vertically downward component that is greater than twice its horizontal component.

6. Roller grate apparatus in accordance with claim 1, 2 or 3 wherein the upper surfaces of said filler members abut the upstream adjacent rollers at a point where a tangential force vector has a vertically downward component that is greater than twice its horizontal component.

7. Roller grate apparatus for subjecting solid mineral particles to a gas flow comprising, in combination, a plurality of parallel horizontal cylindrical rollers having gas passage apertures therethrough, means for continuously feeding said mineral particles onto said rollers and for forming a non-fluidized bed of said particles thereon having a depth greater than several times the average diameter of said particles, means for transporting said bed along a path of travel transverse to the axes of said rollers and including means to rotate said rollers, means including elongated filler members disposed in the nip between adjacent rollers and having upper surfaces whose width in the direction between the rollers is in the range between 1/5 and ½ the diameter of said rollers for introducing resistance to, and for controlling the velocity of flow of said bed along said path of travel, the longitudinal edge of said upper surfaces abutting the upstream adjacent roller at a point where a force vector tangential of said upstream roller has a vertically downward component that is greater than twice its horizontal component, said rollers together with said filler members being adapted to continuously agitate said particles and transport said bed thereacross along said path of travel at a velocity which is only a minor fraction of the circumferential velocity of said rollers, and means to pass a gas stream in a generally vertical direction through said gas passage apertures and said bed while it is being so transported.

8. Roller grate apparatus for subjecting solid mineral particles to a gas flow comprising, in combination, a plurality of parallel horizontal cylindrical rollers having gas passage apertures therethrough, means to continuously deliver said particles onto said rollers and to form a non-fluidized bed of said particles thereon having a depth several times greater than the average diameter of said particles, means for transporting said bed along a path of travel transverse to the axes of said rollers and including means to rotate said rollers, means including elongated filler members disposed in the nip between adjacent rollers and having upper surfaces whose width in a direction between adjacent rollers is in the range from 1/5 to ½ the diameter of said rollers for introducing resistance to the flow of said bed along said path of travel, said rollers and said filler members being adapted to transport said bed along said path of travel at a velocity which is only a minor fraction of the circumferential velocity of said rollers and to simultaneously agitate said particles, and means for passing a gas stream in a direction transverse to said path of travel through said apertures and said bed while it is being so transported.

9. Roller grate apparatus for subjecting solid mineral particles to gas flow comprising, in combination, a plurality of parallel horizontal cylindrical rollers having gas passage apertures therethrough, means for continuously feeding said particles onto said rollers and for forming a non-fluidized bed of said particles thereon having a depth several times greater than the average diameter of said particles, means to transport said bed along a path of travel transverse to the axes of said rollers and including means to rotate said rollers, means including elongated filler member means disposed in the nip between adjacent rollers and having upper surfaces disposed below the uppermost surfaces of said rollers for preventing said particles from jamming said rollers and for introducing resistance to the flow of said bed along said path of travel, and means for passing a gas stream in a generally vertical direction through said gas passage apertures and through said bed as it is transported along said path of travel, said rollers together with said filler members being adapted to continually agitate said particles and to transport said bed along said path of travel at a velocity which is only a minor fraction of the peripheral velocity of said rollers.

10. The method of subjecting solid mineral particles to a gas flow comprising the steps of:

continuously feeding said particles onto parallel horizontal apertured cylindrical rollers, forming a non-fluidized bed of said particles on said rollers having a depth greater than several times the average diameter of said particles, transporting said bed along a path of travel transverse to the axes of said rollers by rotating said rollers to frictionally engage the cylindrical surfaces thereof with said particles, introducing resistance to the flow of said bed along said path of travel by disposing elongated filler members in the nip between adjacent rollers with the upper surface of the filler members below the uppermost surfaces of said adjacent rollers, continually transferring said particles in said bed onto and across said filler members to thereby agitate said particles while said bed is being transported, and passing a gas stream in a generally vertical direction through the apertures in said rollers and through said bed as it is being transported and said particles are being agitated, said roller rotating step being at a circumferential velocity substantially higher than the velocity of said bed along said path of travel.

11. The method of subjecting solid mineral particles to a gas flow comprising the steps of:

continuously delivering said particles onto parallel horizontal cylindrical apertured rollers having elongated filler members in the nip between adjacent rollers, forming a bed of said particles on said rollers and filler members having a depth several times greater than the average diameter of said particles, simultaneously agitating said particles and transporting said bed along a path of travel transverse to the axes of said rollers by rotating said rollers to frictionally engage the cylindrical surfaces thereof with and continually transfer said particles in the lowermost course of said bed onto and across said filler members, and passing a gas stream in a generally vertical direction through the apertures in said rollers and through said bed as it is being so transported and said particles are being agitated, said roller rotating step being at a circumferential velocity substantially higher than the velocity of said bed along said path of travel and said filler members providing resistance to the flow of said bed so that said bed is transported relatively slowly past said gas stream.

12. The method of subjecting solid mineral particles to a gas flow, comprising the steps of:

continuously delivering said particles onto parallel horizontal cylindrical rollers having gas passage apertures therethrough and onto filler members disposed in the nip between adjacent rollers with the upper surface of said filler members positioned below the uppermost surfaces of said adjacent rollers, forming a non-fluidized bed of said particles on said rollers and said filler members having a depth greater than several times the average diameter of said particles, rotating said rollers to frictionally engage their cylindrical surfaces with said particles in the lowermost layer of said bed, transporting said bed in a path of travel transverse to the longitudinal axes of said rollers, continuously transferring said particles in said bed onto and across said filler members to thereby agitate said particles while they are being transported, and passing a gas stream in a generally vertical direction transverse to said path of travel through the apertures in said rollers and through said bed as it is being transported, said filler members introducing resistance to the flow of said bed along said path of travel and said roller rotating step being at a circumferential velocity substantially higher than the velocity at which said bed is transported along said path of travel.

13. The method of subjecting solid mineral particles to a gas flow comprising the steps of:

continuously delivering the particles onto parallel horizontal apertured cylindrical rollers, forming a non-fluidized bed of said particles on said rollers having a depth greater than several times the average diameter of said particles, transporting said bed along a path of travel transverse to the axes of said rollers by rotating said rollers to frictionally engage the cylindrical surfaces thereof with the particles in the lowermost layer of said bed, controlling the velocity of said bed along said path of travel by disposing elongated filler members in the nip between adjacent rollers with their upper surfaces below the uppermost surfaces of the adjacent rollers, continually transferring said particles in said bed onto and across said filler members to thereby agitate the particles as they are being transported in said bed, and passing a gas stream in a generally vertical direction transverse to said path of travel through the apertures in said rollers and through said bed as it is being so transported and said particles are being agitated, said roller rotating step being at a circumferential velocity substantially higher than the velocity at which said bed is transported along said path of travel and said filler members providing resistance to flow of said bed so that said particles are moved at relatively slow velocity past said gas stream.

14. The method of subjecting solid mineral particles to gas flow comprising the steps of:

continuously feeding said particles onto a plurality of parallel horizontal apertured cylindrical rollers, forming a non-fluidized bed of said particles having a depth several times greater than the average diameter of said particles on said rollers, introducing resistance to the flow of said bed along a path of travel transverse to the axes of said rollers by inserting elongated filler members in the nip between adjacent rollers with their upper surfaces disposed below the uppermost surfaces of the adjacent rollers, transporting said bed along said path of travel and simultaneously agitating said particles by rotating said rollers so their cylindrical surfaces frictionally engage the particles in the lowermost layer of said bed and transfer said particles onto and across said filler members, and passing a gas stream in a generally vertical direction through the apertures in said rollers and through said bed as it is being transported and said particles are being transported, said roller rotating step being at a circumferential velocity substantially higher than the flow rate of said bed along said path of travel.

15. The method in accordance with any one of claims 10 through 14 and including the step of controlling the velocity at which said bed is transported by rotating at least one of said rollers downstream from the location of said feeding and forming steps at a slower velocity than rollers upstream therefrom.

16. The method in accordance with any one of claims 10 through 14 and including the step of segregating said particles in accordance to size while said bed is being transported and said particles are being agitated so that the smaller particles settle by gravity to the lower layers of said bed.

17. The method in accordance with any one of claims 10 through 14 and including the step of positioning said filler members at a position in the nip between adjacent rollers where the vertically downward component of the tangential frictional forces of the upstream roller on said particles is greater than twice the horizontal component thereof.

18. The method in accordance with any one of claims 10 through 14 and including the step of controlling the velocity at which said bed is transported by inserting filler members of selected width between adjacent rollers to thereby regulate the magnitude of the resistance to flow of said bed introduced by said filler members.

19. Roller grate apparatus in accordance with claim 1, 2, 3, 7, 8 or 9 and including spring means for resiliently urging said filler members in a vertically downward direction toward said adjacent rollers.

20. Roller grate apparatus in accordance with claim 1, 2, 3, 7, 8 or 9 wherein said gas passage apertures comprise generally circumferential slots in said rollers having minimum tendency to abrade said particles against said filler members.

21. Roller grate apparatus in accordance with claim 1, 2, 3, 7 or 9 wherein certain of said filler members downstream of said feeding means are wider in the direction between adjacent rollers than filler members upstream therefrom to thereby increase the depth of said bed.

22. Roller grate apparatus in accordance with claim 1, 2, 3, 7 or 9 wherein said means to rotate said rollers rotates at least one roller downstream from said feeding means at a slower velocity than rollers upstream therefrom to thereby control the depth of said bed.

* * * * *